(12) United States Patent
Leiser et al.

(10) Patent No.: US 8,672,292 B2
(45) Date of Patent: Mar. 18, 2014

(54) MAGNETIC VALVE

(75) Inventors: Klaus Leiser, Ingelfingen (DE);
Andreas Kaemmer, Ingelfingen (DE);
Armin Arnold, Assamstadt (DE);
Gunter Kabisch, Niedernhall (DE)

(73) Assignee: Buerkert Werke GmbH, Ingelfingen (DE)

( * ) Notice: Subject to any disclaimer, the term of this patent is extended or adjusted under 35 U.S.C. 154(b) by 162 days.

(21) Appl. No.: 13/182,598

(22) Filed: Jul. 14, 2011

(65) Prior Publication Data

US 2012/0012767 A1 Jan. 19, 2012

(30) Foreign Application Priority Data

Jul. 15, 2010 (DE) .................... 20 2010 010 279 U

(51) Int. Cl.
*F16K 31/02* (2006.01)
(52) U.S. Cl.
USPC ....................... 251/129.15; 251/64
(58) Field of Classification Search
USPC ............... 251/129.15, 64
See application file for complete search history.

(56) References Cited

U.S. PATENT DOCUMENTS

| | | | |
|---|---|---|---|
| 4,365,747 A | 12/1982 | Knapp et al. | |
| 5,470,045 A * | 11/1995 | Kazama et al. | 251/129.15 |
| 5,785,297 A * | 7/1998 | Ha | 251/129.14 |
| 6,155,534 A | 12/2000 | Steinruck et al. | |
| 6,182,942 B1 * | 2/2001 | Kadlicko | 251/129.1 |
| 6,182,943 B1 * | 2/2001 | Steinruck et al. | 251/129.16 |
| 6,367,769 B1 * | 4/2002 | Reiter | 251/129.19 |
| 6,572,077 B1 | 6/2003 | Wörner | |
| 6,683,519 B1 | 1/2004 | Schanzel et al. | |
| 2006/0163512 A1 * | 7/2006 | Ogawa | 251/129.15 |
| 2008/0302984 A1 | 12/2008 | Kratzer | |
| 2011/0315907 A1 * | 12/2011 | Ams et al. | 251/129.15 |

FOREIGN PATENT DOCUMENTS

| | | |
|---|---|---|
| AU | 2003204219 | 5/2003 |
| CN | 2517929 | 10/2002 |
| DE | 2303450 | 8/1974 |
| DE | 3439378 | 4/1986 |
| DE | 10222218 | 4/2003 |
| DE | 102004033695 | 2/2006 |
| DE | 102007059054 | 6/2009 |
| EP | 1536169 | 6/2005 |

OTHER PUBLICATIONS

German Search Reported dated Jul. 18, 2011.

* cited by examiner

*Primary Examiner* — John K Fristoe, Jr.
*Assistant Examiner* — Ian Paquette
(74) *Attorney, Agent, or Firm* — Carlson, Gaskey & Olds, PC

(57) ABSTRACT

A valve comprises a magnetic drive and a core which is arranged therein to be movable in an axial direction, and which serve to open and close a valve seat. At least two flat springs stacked upon each other are arranged on an axial end of the core.

17 Claims, 3 Drawing Sheets

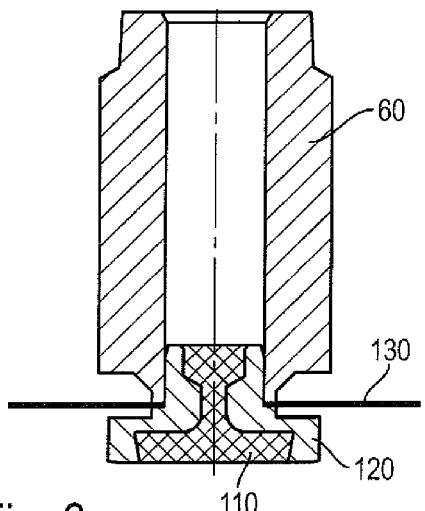
Fig. 3a
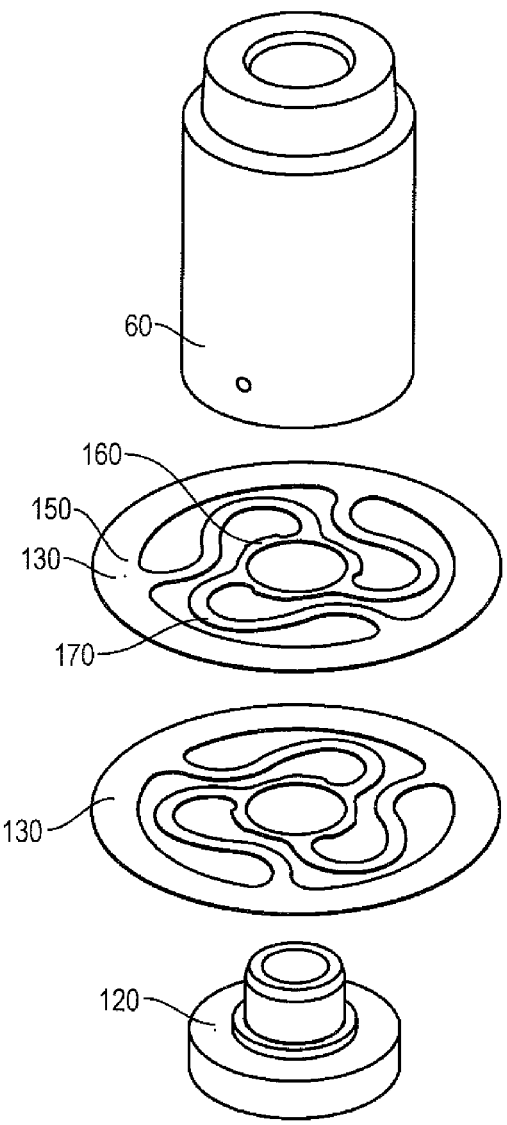
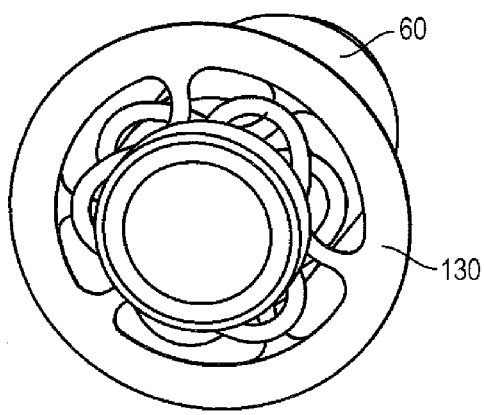
Fig. 3c   Fig. 3b

MAGNETIC VALVE

RELATED APPLICATION

This application claims priority to German Application No. 20 2010 010 279.0, which was filed Jul. 15, 2010.

FIELD OF THE INVENTION

The invention relates to a valve comprising a magnetic drive and a core which is arranged therein to be movable in an axial direction, and which serves to open and close a valve seat.

BACKGROUND

For valves which are intended to be used to regulate the flow rate of liquid or gaseous fluids, and where additional functions beyond an ON/OFF function are required, an actuator must be able to assume any desired position within a maximum stroke in a core guiding tube in a reliably reproducible way and within short time. In this process, any occurring friction and the resulting "stick-slip" effect, with larger static friction as compared to dynamic friction, is particularly disruptive. A reliable regulation of the flow rate is not ensured any more in this case.

This is why valves are of interest in which the actuators can be moved by a driving element in a friction-free manner. A known possibility is to use flat springs as guiding elements.

A regulating valve is known from EP 1 536 169 in which the core is guided at its two ends by two flat springs with minimum radial clearance in the core guiding tube along the entire stroke in a non-contact and hence friction-free manner.

Eliminating the friction, however, implies a reduction of damping action of an oscillatory system including a valve armature and flat springs, making it easier to perform excitable vibrations. Such excitations may be caused by sound waves, for example, generated at elevated pressures behind a valve seat where gas expands and compression shocks occur as a rule. In case these sound waves are partially reflected at downwardly (outside the valve) located flow resistance elements (restrictor elements, line connections etc.), resonance phenomena and an associated excitation of undesired vibrations of the core may occur. In this case, regulating the flow rate is not possible any more.

SUMMARY

A valve comprises a magnetic drive and a core which is arranged therein to be movable in an axial direction, and which serves to open and close a valve seat. At least two flat springs are stacked upon each other, and are arranged on an axial end of the core. The flat springs serve for guiding the core and ensure its friction-free movement in a core guiding tube. Thus, any tilting of the core is prevented. It goes without saying that a spring stack that includes more than two flat springs may be used as well.

In case that identical flat springs are stacked in such a manner that they perfectly cover each other, the effective spring force is changed by the number of the springs. With an appropriate dimensioning of a spring, for example with one flat spring of larger thickness, it would be possible to achieve the same force as with two springs of smaller thickness.

In an advantageous embodiment of a valve, the at least two flat springs are stacked upon each other such that a perfect covering does not occur. This non-covering arrangement of the flat springs relative to each other causes the system to be damped down. In this way, an undesired excitation of vibrations of the core may be completely avoided.

A non-covering arrangement of the flat springs may be achieved in particular in that the flat springs differ from each other in terms of their shape and/or orientation in relation to each other.

According to example embodiments of the invention, the at least two flat springs have essentially the same, preferably an identical shape and are rotated relative to each other. The expression "rotating relative to each other" either means rotating a flat spring around a central axis located in a plane of the spring by 180° or rotating a flat spring by an arbitrary angle around its central axis perpendicular thereto.

Advantageously, the stacked flat springs are firmly connected to each other so that the desired positioning is permanently fixed and any later displacement is prevented. Preferably, the flat springs are pressed or bolted to each other.

In a further embodiment, the flat springs stacked upon each other are arranged on that axial end of the core which is located opposite the valve seat. Due to the customary construction of a valve, there is more space available on the side of the valve seat than on the side of the valve plug. It is also conceivable, however, that the flat springs stacked upon each other are arranged on the side of the axial end of the core facing away from the valve seat. In terms of the mode of action, it does not matter at which one of the two core ends the flat springs are positioned.

The flat springs preferably have their outer edges resting on a shoulder in a fluid housing and are fixed by the magnetic drive, in particular by a prolonged core guiding tube. The flat springs may be clamped between the magnetic drive and the fluid housing in which the valve seat is arranged. The prolonged core guiding tube of the magnetic drive may extend into the fluid housing and press the flat springs against the shoulder in the fluid housing. In addition, an insert ring may be arranged between the shoulder in the fluid housing and the flat springs so that the springs will abut on the insert ring.

Preferably, the flat springs are formed to be disc-shaped and comprise two concentric rings which are connected to each other by arms. It is possible, for instance, to provide three or four arms as connecting elements between the two rings. In particular, the arms have a meander-like structure. The production of the flat springs is carried out according to known methods such as laser cutting or chemical wet etching. Stacking flat springs upon each other such that they do not perfectly cover each other implies that the arms are crossed.

The inner rings of the flat springs are preferably clamped between a seal retainer cooperating with the valve seat and an end of the core opposite the valve seat. It is also possible, however, to attach a seal without any separate seal retainer directly to the end of the core, and to firmly connect the inner edge of the flat springs to the end of the core.

In a further embodiment, at least one further flat spring is arranged on that axial end of the core which faces away from the valve seat. This flat spring has the function, just like the other flat springs, to guide the core in the core guiding tube in a friction-free manner. The at least one further flat spring may additionally take the restoring function in the valve. This has the advantage that no further spring will be required which in the closed state of the valve would press the core with seal onto the valve seat.

Preferably, the further flat spring has its outer edge resting on a shoulder on the core and an inner ring of the further flat spring is retained with an adjustment screw. The preload and the valve stroke are adjusted by the adjustment screw in a known manner.

In another embodiment of the valve, the further flat spring has its outer edge firmly connected to a plug (in the interior of the magnetic drive), in particular by spot welding, and an inner ring of the further flat spring rests on a bearing part on the core. The bearing part and the core may also be designed in one piece.

Depending on the application, i.e. according to the required performance characteristics of the valve, the core is engaged by a further spring element for returning the core. The further spring element is preferably inserted between the core and the plug. Through this, the tightness of the valve may be guaranteed even with elevated fluid pressures present on the valve seat.

The valve according to the invention is particularly suited for regulating liquids or gases. For these applications, a magnetic drive with proportional behavior is preferred.

These and other features of the present invention can be best understood from the following specification and drawings, of which the following is a brief description.

BRIEF DESCRIPTION OF THE DRAWINGS

FIG. 3a shows a cross-section of a core provided with flat springs;

FIG. 3b is an exploded view of the core and the flat springs of FIG. 3a; and

FIG. 3c is a top view of the core comprising the flat springs according to FIG. 3a and FIG. 3b.

DETAILED DESCRIPTION

Figure 1:
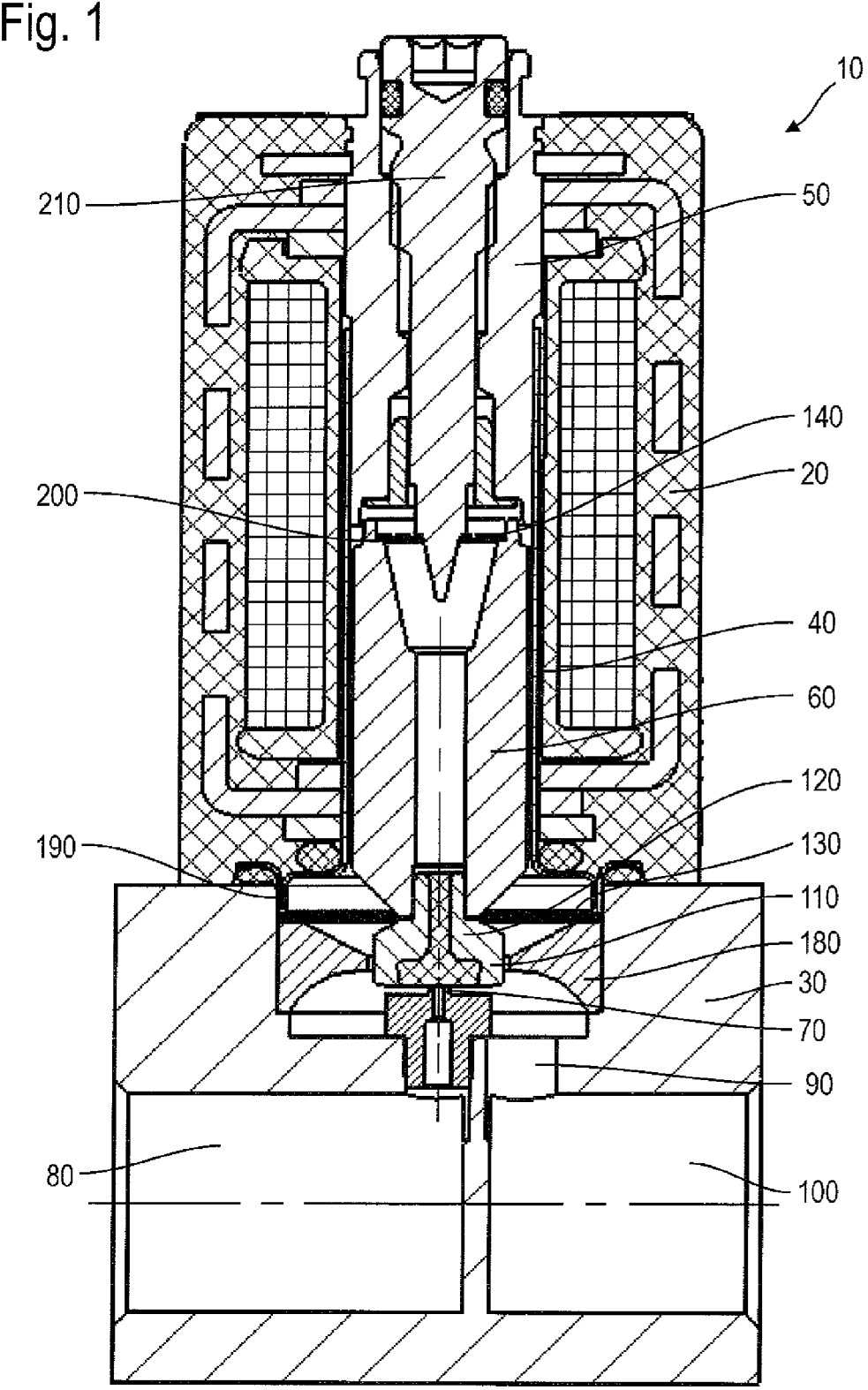
FIG. 1 shows a cross-section through a first embodiment of a valve according to the invention.

FIG. 1 illustrates a cross-section of a valve 10 comprising a magnetic drive 20 and a fluid housing 30 which are tightly connected to each other. A core guiding tube 40 comprises a stationary plug 50 and a core 60 which can move in axial direction. The core 60 serves to open and close a valve seat 70, and is arranged in the magnetic drive 20. The valve seat 70 is arranged in the fluid housing 30 at the end of a fluid inlet 80 and is in fluidic communication with at least one housing recess 90 opening into a fluid outlet 100.

With this arrangement, an "inflow below seat" is realized. It would also be possible, however, that the valve seat is arranged at the end of the fluid outlet and is in fluidic communication with the fluid inlet whereby an "inflow above seat" is realized. Valves according to the invention are suitable for both modes of operation.

Opposite the valve seat 70, a seal 110 is arranged on the one end of the core 60 which protrudes into the fluid housing 30, and can clear or close the valve seat 70 upon movement of the core 60. The seal 110 is retained in a seal retainer 120 which is firmly connected to the end of the core 60, for instance is pressed therein. It is also possible to arrange the seal 110 directly on the end of the core 60 opposite the valve seat 70.

At both of its axial ends, the core 60 is equipped with flat springs 130, 140 that guide the core 60 in the core guiding tube 40 in a friction-free manner. The flat springs 130 are located at the one axial end of the core 60 which is closer to the valve seat 70.

As can be taken from FIG. 3b, the flat springs 130 are formed like discs and have an outer ring 150 and an inner ring 160 which are concentrically arranged and connected to each other through arms 170. In the illustrated embodiment, the flat springs 130 have three arms 170 with a meander-like shape. The shown geometry of the flat spring 130 is exemplary. The valves according to the invention also operate with flat springs with a different geometry or more than three arms.

At least two flat springs 130 are stacked upon each other, but do not perfectly cover each other. The stacked flat springs 130 are arranged at the axial end of the core 60 opposing the valve seat 70. The flat springs 130 stacked upon each other in this way bring about an advantageous damping characteristic of the system so that an undesired excitation to perform vibrations is prevented, ensuring an optimum controllability of the valves.

FIG. 3a shows a cross-section of a core 60 which has one end firmly connected to flat springs 130. The inner rings 160 of the flat springs 130 are clamped between a seal retainer 120 and an axial end of the core 60. The seal retainer 120 carries the seal 110 which in the valve 10 clears or closes the valve seat 70.

In FIGS. 3a-3c, two identical flat springs 130 are stacked upon each other which are rotated relative to each other by an angle of 60°. The value of 60° is determined by symmetry reasons with a number of three arms 170. In case of four connecting arms, a rotation angle of 45° would be selected. The desired damping effect realized through non-covering flat springs is also achieved if the flat springs differ in their shape, i.e. if flat springs are used which are not identical. In case of identical flat springs, one of the flat springs may also be turned by 180° around a central axis lying in the plane of the flat spring.

The flat springs 130 are firmly connected to each other; in particular, they are pressed or bolted. This ensures that the flat springs do not change their relative position during valve operation, which might be caused by occurring concussions.

The core 60 comprising the stacked flat springs 130 according to FIGS. 3a-3c is arranged in the valve 10 in the core guiding tube 40 of the magnetic drive 20 so as to be axially movable. As shown in FIG. 1, the flat springs 130 have their outer edge 150 resting on an insert ring 180 arranged in the fluid housing 30 above the valve seat 70, and are retained through a prolongation 190 of the core guiding tube 40 in the fluid housing 30.

The insert ring 180, serving for conditioning the flow of the fluid, is optional. In case the insert ring is not provided, the flat springs rest on a shoulder in the fluid housing 30 and are clamped at the shoulder between the magnetic drive 20 and the fluid housing.

A further flat spring 140 is arranged at that axial end of the core 60 which faces away from the valve seat 70. The flat spring 140 has the same structure as the flat springs 130. Several stacked flat springs 140 may be inserted at this end of the core 60, too.

The flat spring 140 has its outer edge 150 resting on a shoulder 200 on the core 60. The inner ring 160 of the flat spring 140 is retained by an adjustment screw 210, axially extending through the plug 50 on both sides. Adjustment screws are known. With these, the preload of the flat spring 140 and the valve stroke can be adjusted. Advantageously, the flat spring 140 serves for guiding the core 60 as well as for its returning. This means that the spring force of the flat spring 140 ensures that the valve seat 70 is tightly closed in the current-less state of the magnetic drive 20.

Figure 2:
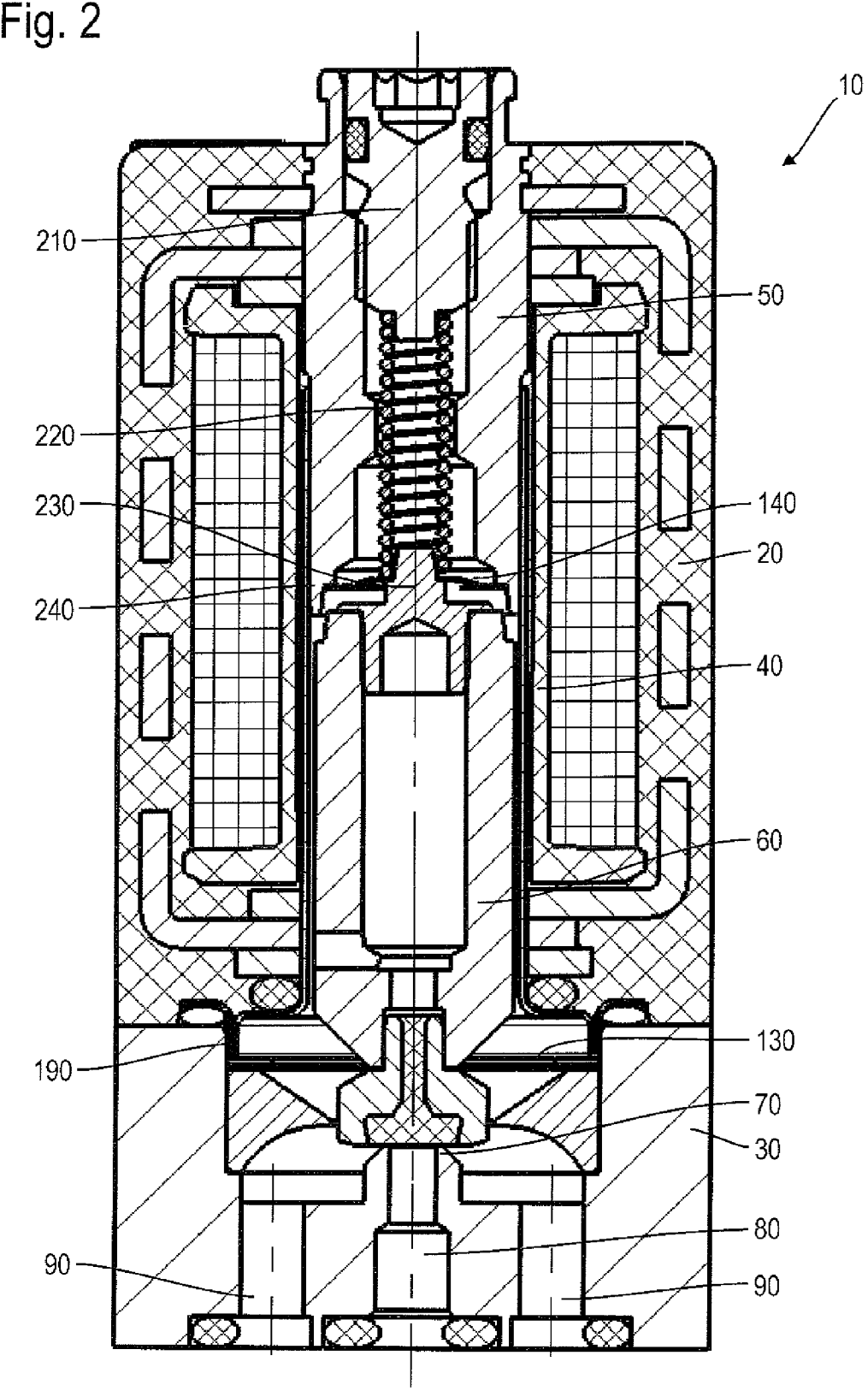
FIG. 2 shows a cross-section through a second embodiment of a valve according to the invention.

FIG. 2 shows a cross-section of a further embodiment of a valve 10 according to the invention, which is very similar to the valve 10 according to FIG. 1. Here too, flat springs 130 stacked upon each other are used which prevent undesired vibrations of the core 60. The flat springs 130 and 140 each have the function to guide the core 60 in the core guiding tube 40 in a friction-free manner.

The function of returning the core 60 is fulfilled here by a further spring element 220, in particular in the form of a spiral spring arranged within the plug 50 between the adjustment screw 210 and the core 60. The spring element 220 is required in particular in those cases in which the valve 10 has to control elevated fluid pressures.

In this embodiment, the flat spring 140 has its outer edge 150 firmly connected to a shoulder 230 in the plug 50, and in particular is welded. The inner ring 160 rests on a bearing part 240 which is firmly connected to that end of the core 60 which faces away from the valve seat 70.

The valves 10 according to the invention are particularly suited for magnetic drives 20 with proportional behavior.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A regulating valve to regulate a flow rate of gaseous or liquid fluid comprising:
   a magnetic drive having a proportional behavior;
   a core arranged in the magnetic drive to be movable in an axial direction and to serve for opening and closing a valve seat; and
   at least two flat springs being arranged on an axial end of the core, the at least two flat springs being stacked upon each other,
   wherein the at least two flat springs are all disc-shaped and all include two concentric rings which are connected to each other by arms,
   wherein the at least two flat springs are positioned relative to each other such that one flat spring is rotated relative to the other flat spring about a common central axis of the at least two flat springs and which is parallel to the axial direction such that one flat spring is rotationally offset relative to the other flat spring, and
   wherein the at least two flat springs guide the core and provide a friction-free movement of the core.

2. The valve according to claim 1, wherein the at least two flat springs have an identical shape and are rotated relative to each other by a predetermined angle.

3. The valve according to claim 1, wherein the at least two flat springs are firmly connected to each other.

4. The valve according to claim 1, wherein the core is engaged by a spring element for returning the core.

5. The valve according to claim 1, wherein the at least two flat springs are arranged on an end of the core opposite the valve seat.

6. The valve according to claim 5, wherein the at least two flat springs have outer edges resting on a shoulder in a fluid housing and are fixed by the magnetic drive by a prolonged core guiding tube.

7. The valve according to claim 1, wherein the arms are meander-like arms.

8. The valve according to claim 7, wherein inner rings of the at least two flat springs are clamped between a seal retainer cooperating with the valve seat and an end of the core opposite the valve seat.

9. The valve according to claim 1, including at least one further flat spring that guides, or guides and returns, the core is arranged on the end of the core facing away from the valve seat.

10. The valve according to claim 9, wherein the further flat spring has an outer edge resting on a shoulder on the core and an inner ring of the further flat spring is retained with an adjustment screw.

11. The valve according to claim 9, wherein the further flat spring has an outer edge firmly connected to a plug and an inner ring of the further flat spring rests on a bearing part on the core.

12. The valve according to claim 1, wherein the at least two flat springs comprise at least first and second flat springs.

13. The valve according to claim 12, wherein the arms have a meander shape.

14. The valve according to claim 13, wherein one of the first and second flat springs is rotated about the central axis relative to the other of the first and second flat springs such that the arms of the first flat spring are not perfectly aligned with the arms of the second flat spring.

15. The valve according to claim 13, wherein the at least two first and second flat springs are firmly connected to each other.

16. The valve according to claim 12, wherein one of the first and second flat springs is rotated about the central axis relative to the other of the first and second flat springs such that the arms of the first flat spring are not aligned with the arms of the second flat spring.

17. The valve according to claim 16, wherein the at least two first and second flat springs are firmly connected to each other.

* * * * *